(12) United States Patent
Beltramo, Jr.

(10) Patent No.: US 10,945,561 B2
(45) Date of Patent: Mar. 16, 2021

(54) BLADE RUNNER CUTTING/CHOPPING BOARD

(71) Applicant: Daniel A. Beltramo, Jr., Menlo Park, CA (US)

(72) Inventor: Daniel A. Beltramo, Jr., Menlo Park, CA (US)

( * ) Notice: Subject to any disclaimer, the term of this patent is extended or adjusted under 35 U.S.C. 154(b) by 156 days.

(21) Appl. No.: 15/945,035

(22) Filed: Apr. 4, 2018

(65) Prior Publication Data

US 2018/0296042 A1  Oct. 18, 2018

Related U.S. Application Data

(60) Provisional application No. 62/486,579, filed on Apr. 18, 2017.

(51) Int. Cl.
*B23Q 3/00* (2006.01)
*A47J 47/00* (2006.01)

(52) U.S. Cl.
CPC .................................. *A47J 47/005* (2013.01)

(58) Field of Classification Search
USPC ......... 269/87.2, 295, 309; 83/454, 746, 762, 83/932
See application file for complete search history.

(56) References Cited

U.S. PATENT DOCUMENTS

| | | | |
|---|---|---|---|
| 1,764,235 A * | 6/1930 | Wilmking | B26B 29/063 83/762 |
| 3,369,582 A | 2/1968 | Giangiulio | |
| 3,561,511 A | 2/1971 | Kummer | |
| 4,189,132 A | 2/1980 | Di Russo | |
| 4,852,256 A | 8/1989 | Schoettler | |
| 5,287,784 A * | 2/1994 | Brockett | A47J 47/00 83/746 |
| 5,481,953 A * | 1/1996 | McLeod | B26B 29/063 269/295 |
| 5,499,578 A | 3/1996 | Payne | |
| 5,626,067 A | 5/1997 | Lothe | |
| 5,927,701 A * | 7/1999 | Chapman | B26D 3/30 269/295 |
| 7,007,583 B1 * | 3/2006 | Fiola | B26B 29/063 269/288 |
| 7,191,691 B2 | 3/2007 | Kaposi | |
| 8,241,688 B2 * | 8/2012 | Aguirre | A47J 47/005 426/518 |

* cited by examiner

*Primary Examiner* — Joseph J Hail
*Assistant Examiner* — Shantese L McDonald
(74) *Attorney, Agent, or Firm* — Kirk Dorius; Dorius Law P.C.

(57) ABSTRACT

A comestible cutting/chopping board which enables a user to align and cut or chop comestibles, preferably seed-to-egg sized, the board including side walls defining a longitudinal trough of V-shape or U-shape or half-pipe shape, the side walls preferably providing uneven surfaces, and the cutting/chopping board including structure traversing the side walls, most preferably end structures, providing a slot for penetration of a longitudinally oriented knife and providing for retaining at least some comestibles in the trough, the cutting/chopping board having a base for stabilizing the trough upon a horizontal surface.

19 Claims, 11 Drawing Sheets

BLADE RUNNER CUTTING/CHOPPING BOARD

This application relates to and claims priority to provisional application Ser. No. 62/486,579, filed Apr. 18, 2017, entitled Blade Runner Cutting/Chopping Board, having inventor Daniel A. Beltramo, Jr. The contents of the referenced provisional application are herein and hereby incorporated by reference in their entirety

FIELD OF THE INVENTION

The present invention relates to a comestible cutting/chopping board which enables a user to align and cut or chop comestibles, preferably seed-to-egg sized comestibles, and more specifically enables a medial slicing of multiple food objects of differing sizes along a longitudinal axis in a manner that does not require fingers to touch the items being sliced. The board further consolidates items for slicing or chopping for efficiency of movement and for transfer from a cutting/chopping surface to a next stage in a food preparation process.

BACKGROUND OF THE INVENTION

The use of devices related to the cutting/chopping of comestibles is known. By way of example U.S. Pat. No. 5,499,578 describes a sausage cutting device. U.S. Pat. No. 5,626,067 is a slicer guide for cutting food. U.S. Pat. No. 3,369,582 describes a tomato slicer. U.S. Pat. No. 3,561,511 describes an egg slicer. U.S. Pat. No. 4,189,132 describes a sausage cutting device. U.S. Pat. No. 4,852,256 describes a device for cutting mushrooms. U.S. Pat. No. 7,191,691 describes a food chopper. Devices from the Internet include: the Joie brand Tomato Slicer and Knife made by MSC International (https://www.amazon.com/MSC-International-31667-Tomato-Slicer/dp/B00380HVOM), a tool that holds large tomatoes to facilitate multiple parallel slices; the Emson brand Multi-Function Handheld Round Fruit Slicer (https://www.amazon.com/Multi-Functional-Handheld-Mushrooms-Slicers-Vegetable/dp/B01IINPU0U/ref=pd_lpo_79_tr_t_3) which holds individual fruit or vegetable items to facilitate multiple parallel slices; the Oxo brand Good Grips Grape and Tomato Slicer & Cutter (https://www.amazon.com/OXO-Grips-Tomato-Slicer-Cutter/dp/B00L3XIX9S/ref=pd_sim_79_1) which clamps multiple grapes or tomatoes for cutting; the Amariver brand Thumb Press Grape cutter (https://www.amazon.com/Amariver-Practical-Material-Syringe-shaped-Comfortable/dp/B01GR3YEQY/ref=sr_1_8) which quarter cuts small fruit like cherry tomatoes by pushing them through a set of perpendicular blades; Progressive brand Prepworks Zip Slicer (https://www.amazon.com/Prepworks-by-Progressive-Zip-Slicer/dp/B00KO2OWVM/ref=pd_sbs_79_5) which enables user to cut multiple cherry tomatoes or grapes by sliding an integrated serrated blade through them; and Cherry Tomato Slicer (https://cocreate.firstbuild.com/HowardK/cherry-tomato-slicer/) which enables a user to cut multiple cherry tomatoes by clamping them in a clam shell device.

While the above devices fulfill their respective, particular objectives and requirements, the aforementioned patents and devices do not describe a trough-shaped cutting/chopping board that holds and aligns objects of different sizes and shapes such that multiple objects can be cut medially with the user's knife without the need to place fingers in the proximity of the cutting/chopping blade, and with a transverse piece to guide the blade. Side wall slots may additionally provide for orthogonal cutting or slicing.

OBJECTS OF THE INVENTION

It is an object of the invention to provide a new and improved, preferably seed-to-egg sized, comestible cutting/chopping board which facilitates a simultaneous, medial cutting/chopping of a plurality of comestibles.

It is a preferred object of the invention that the cutting/chopping board be structured and dimensioned to align comestibles in a series for cutting, prior to an initial cut as well as after the initial cut.

It is a preferred object of the invention, for versatility, to also be structured to hold and stabilize single or multiple items larger than an egg such as cylindrical or conically shaped foodstuffs like carrots, zucchini, sausages or hot dogs; or bulbous foodstuffs like citrus fruit or apples; or wedge shaped foodstuffs like apple or citrus wedges for longitudinal cutting.

It is a preferred object of the invention to be structured to enable efficient transfer of cut comestibles to a succeeding next receptacle.

It is a preferred object of the invention that it enable, after cutting/chopping comestibles, pieces and/or juices to be contained in a confined space, for continual cutting/chopping and/or for efficient transfer to their next place.

It is a preferred object of the invention to assist a user to align a knife for medial cuts while enabling some flexibility of alignment for non-medial cutting/chopping.

It is a preferred object of the invention that one portion of a cutting/chopping/retaining trough be "blocked" in a manner to allow and guide a knife toward a medial cut of comestibles while blocking the exit of said comestibles.

It is a preferred object of the invention that it also enable parallel, transverse slicing of comestibles, preferably with equal spacing between slices, depending on design.

It is a preferred object of the invention that panels that form a cutting/chopping/retaining trough form other troughs, of potentially differing sizes, and form a base of the cutting/chopping board.

It is a preferred object of the invention that a user use their own knife to do the cutting/chopping.

It is a preferred object of the invention that the cutting/chopping/retaining board comprise multiple troughs which may not be of equal shape or size to better accommodate different sizes or shapes of comestibles.

It is a preferred object of the invention that the board be designed with a symmetry along its longitudinal axis in order to create multiple troughs, enhance balance and stability, and/or add a degree of aesthetic beauty.

It is a preferred object of the invention that the board be manufactured of one piece or be comprised of two interlocking pieces of material that may be easily disassembled.

It is a preferred object of the invention to enable a user to cut the aforementioned comestibles without the need to place fingers in the proximity of a cutting/chopping blade.

It is a preferred object of the invention to provide a cutting/chopping board which is of durable and reliable construction.

It is a preferred object of the invention to provide a cutting/chopping board which is easy to clean.

A further preferred object of the invention is also to provide a comestible cutting/chopping board which is susceptible of a low cost of manufacture with regard to both materials and labor, and which accordingly is then susceptible of low prices of sale to the consuming public, thereby making such a comestible cutting/chopping board economically available to the buying public.

It is a preferred object of the invention to be visually attractive.

For an understanding of the invention, its operating advantages and the specific objects attained by its uses, reference may be had to the accompanying drawings and descriptive matter in which is illustrated preferred embodiments of the invention.

(Before explaining embodiments of the invention in detail, it is to be understood that the invention is not limited in its application to the details of construction and to the arrangements of the components as set forth in the following description or as illustrated in the drawings. The invention is capable of other embodiments and of being practiced and carried out in various ways. The phraseology and terminology employed herein are for the purpose of description and should not be regarded as limiting. The conception, upon which this disclosure is based, may readily be utilized as a basis for the designing of other structures, methods and systems for carrying out the several purposes of the present invention. It is important that the claims be regarded as including such equivalent constructions insofar as they do not depart from the spirit and scope of the present invention. The purpose of the abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.)

SUMMARY OF THE INVENTION

One embodiment of the invention provides a new and improved comestible cutting/chopping board, preferably of seed-to-egg sized comestibles, comprised of at least one open "U" or "V" or half-pipe shaped trough, having an angular, rounded or flat bottom, the trough structure having a base for stabilizing on a counter top and a structural element transverse to the trough, preferably an end piece attached to the trough or the base, which provides a stop for the items and a slot for penetration of a longitudinally oriented knife. The slot could be formed by two sections of the end piece. The trough is preferably structured to hold and stabilize in a longitudinal series a plurality of seed-to-egg sized comestibles for simultaneous cutting. The trough is preferably structured, for versatility, to also hold and stabilize single or multiple items larger than an egg such as cylindrical or conically shaped foodstuffs like carrots, zucchini, sausages or hot dogs; or bulbous foodstuffs like citrus fruit or apples; or wedge shaped foodstuffs like apple or citrus wedges for longitudinal cutting. Preferably the trough provides a bottom surface sloping longitudinally downward toward an end piece when the base is positioned on a horizontal surface. Preferably side panels of the trough provide uneven surfaces to minimize a tendency for attachment of cut comestibles to side panels.

The troughs may be formed of pieces that removably interlock, longitudinally or orthogonally.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF PREFERRED EMBODIMENTS

Figure 4:
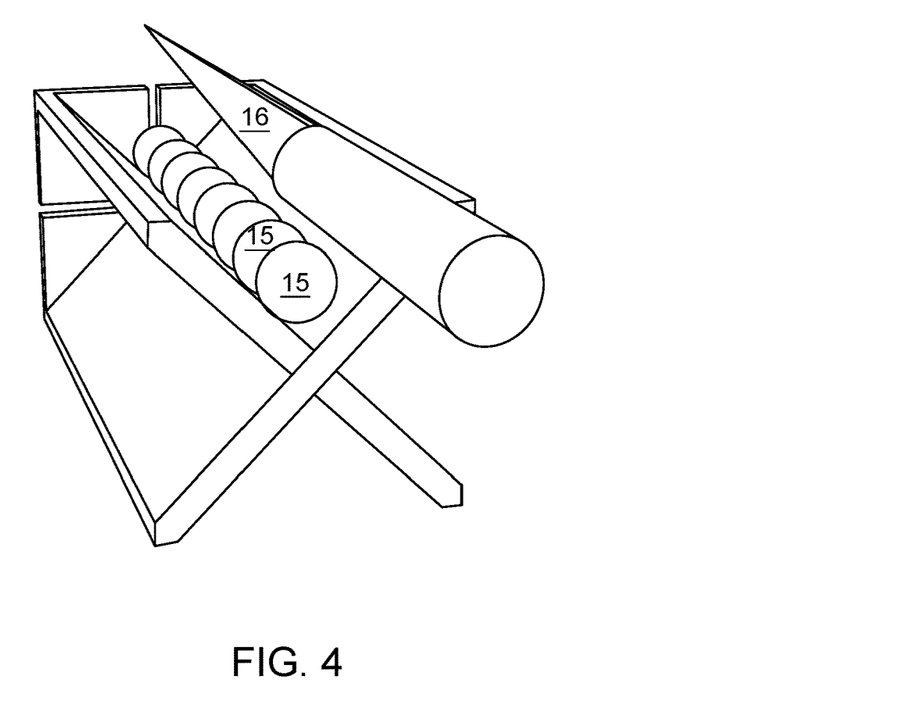
FIG. 4 offers a front perspective view of a cutting/chopping board of the type of FIG. 1, looking down a trough from an open end to a closed end, and in which comestibles are located in a trough ready for cutting and a knife is positioned for cutting.
Figure 5:
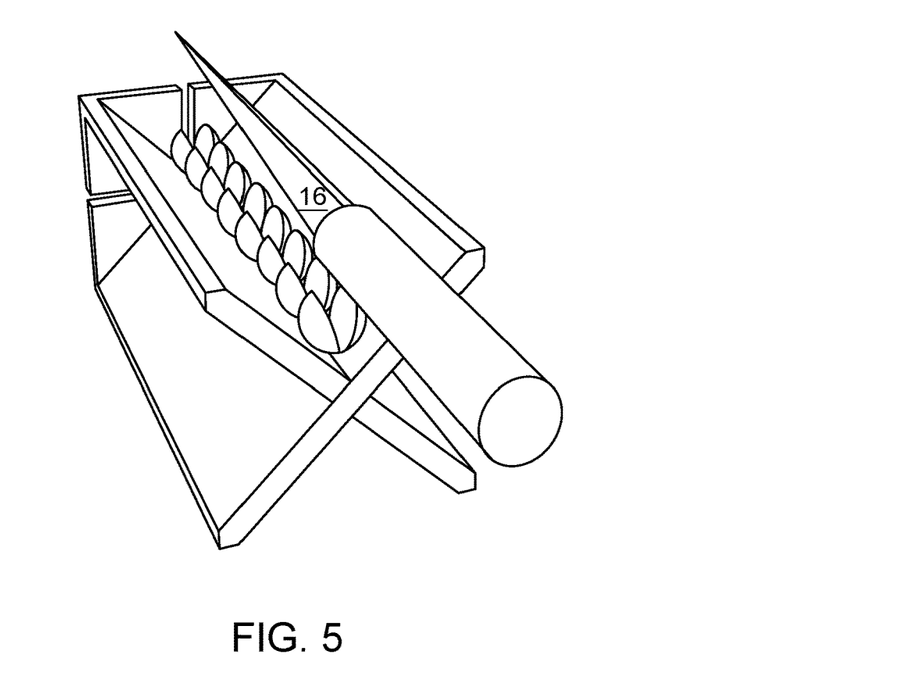
FIG. 5 offers a front perspective view like FIG. 4, looking down the trough from an open end to a closed end, and in which the comestibles of FIG. 4 are located in the trough having been cut medially by a knife that is positioned for cutting.
Figure 6:
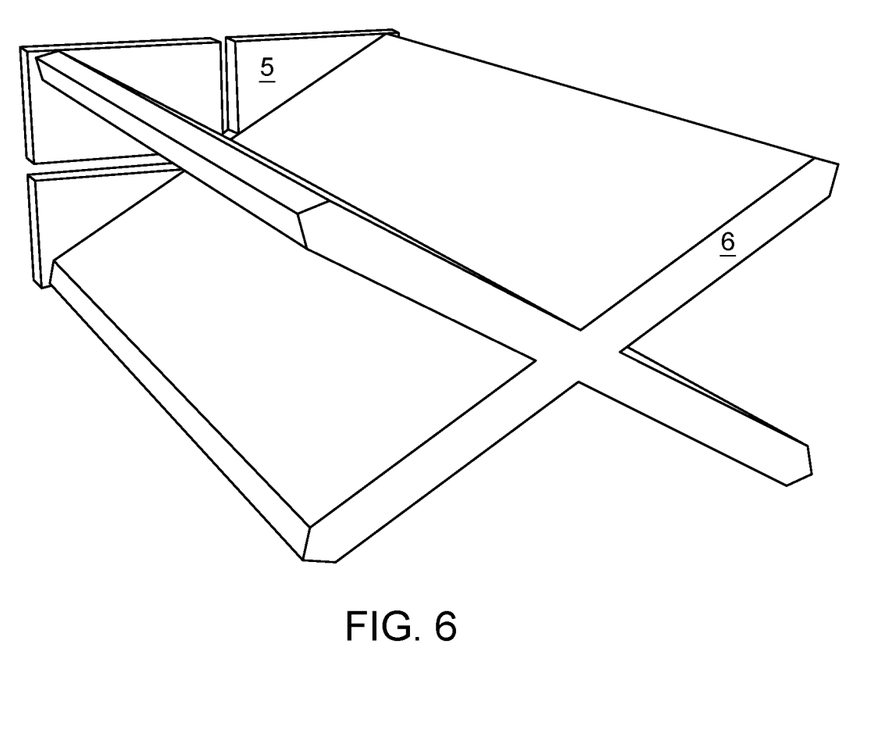
FIG. 6 offers a front perspective view looking down a trough from an open end to a closed end of an embodiment similar to FIG. 4 but in which the troughs are of different sizes and angles.

With reference to the drawings, preferred embodiments (of preferably a seed-to-egg sized comestible cutting/chopping board) are provided embodying principles and concepts of the invention. In the various Figures the devices relate to a new and improved, again preferably seed-to-egg sized, comestible 15, cutting/chopping boards 7 for enabling a user to cut a plurality of comestibles 15 medially in one slice. See in particular FIGS. 4 and 5. There is no reason, of course, for all boards to be scaled to seed-to-egg sized comestibles.

In the embodiment of FIGS. 1-9, cutting/chopping board 7 includes two bisecting and interlocking sidewall panels 3 and 4 which form side walls to define at least one trough 1, and may in fact form side walls to define a plurality of troughs 1, with downward troughs serving as bases. A third, transverse panel 5, with slot 2, which can be formed of two pieces, approximately blocks one portion or end of the trough(s) 1. Panels 5 can be formed of multiple panel sections illustrated as sections 9 in FIG. 2. In these embodiments, as can be seen, the base of the structure as well as the trough of the structure 7, is efficiently formed of the panels 3 and 4.

The cutting/chopping board 7 of the embodiments of FIGS. 1-9 is an embodiment that includes two bisecting and removably interlocking panels 3 and 4 that form the side walls of longitudinal troughs 1. The troughs can be of the same or of different widths. One end of a trough(s) is blocked by a third panel 5, oriented and attached transverse to the panels 3 and 4. Panel 5 (possibly comprised of panel-sections 9, see FIG. 2) provides one (or more) slots or grooves 2 through which a cutting/chopping knife 16 (FIGS. 4, 5) may pass. The other end of trough(s) 1 is preferably open, shown ending at surfaces 6.

Cutting/chopping board 7 may be manufactured as a unitary object, as indicated in FIGS. 10-12, 14 and 15 rather than from multiple parts, as illustrated in FIGS. 1-9. As a unitary object or as a disassembleable composite, the board could comprise panels 3 and 4 with protrusions 9 on one end of each panel 3 and 4. When a disassembleable board is assembled, protrusions 9 create and end piece 5 forms groove 2 through which knife 16 can pass.

Figure 1:
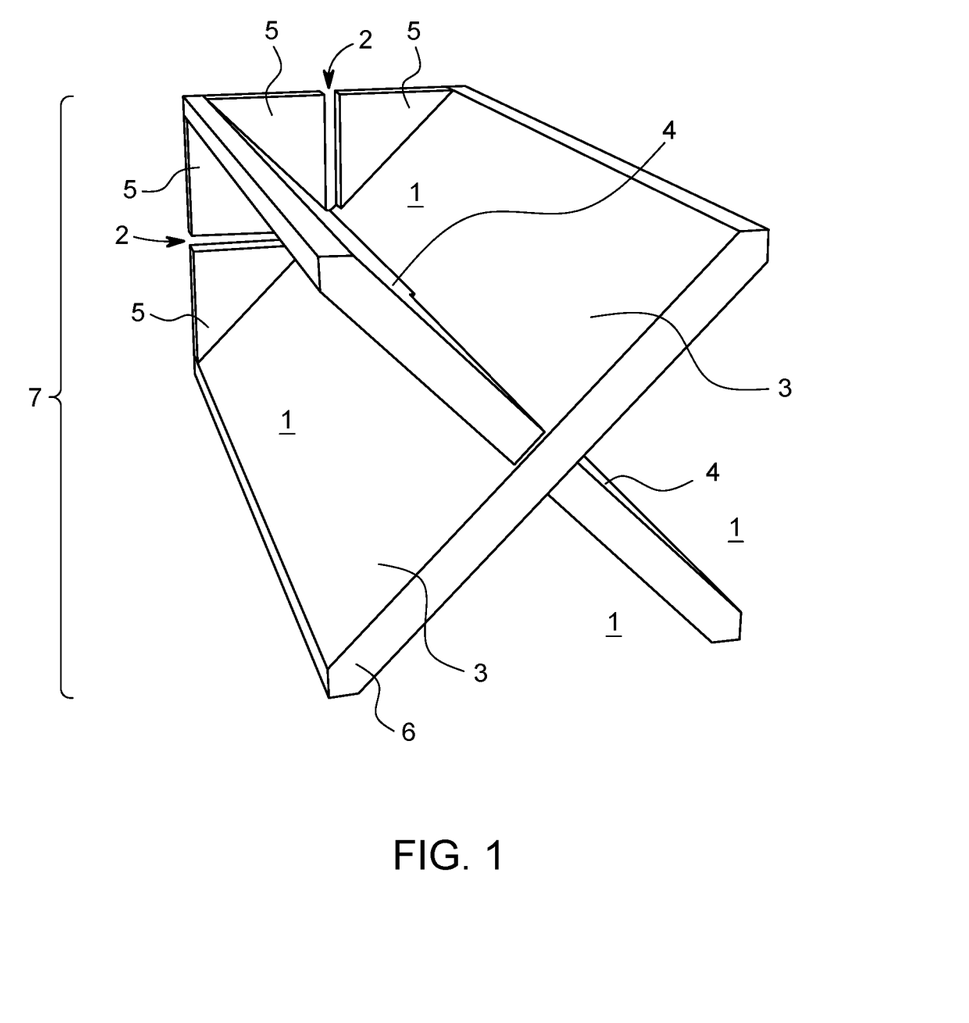
FIG. 1 is a perspective view of one preferred embodiment of the comestible cutting/chopping board constructed to provide multiple troughs, having end pieces with slots to facilitate longitudinal cutting, and wherein the side panels form troughs as well as bases for the board.
Figure 2:
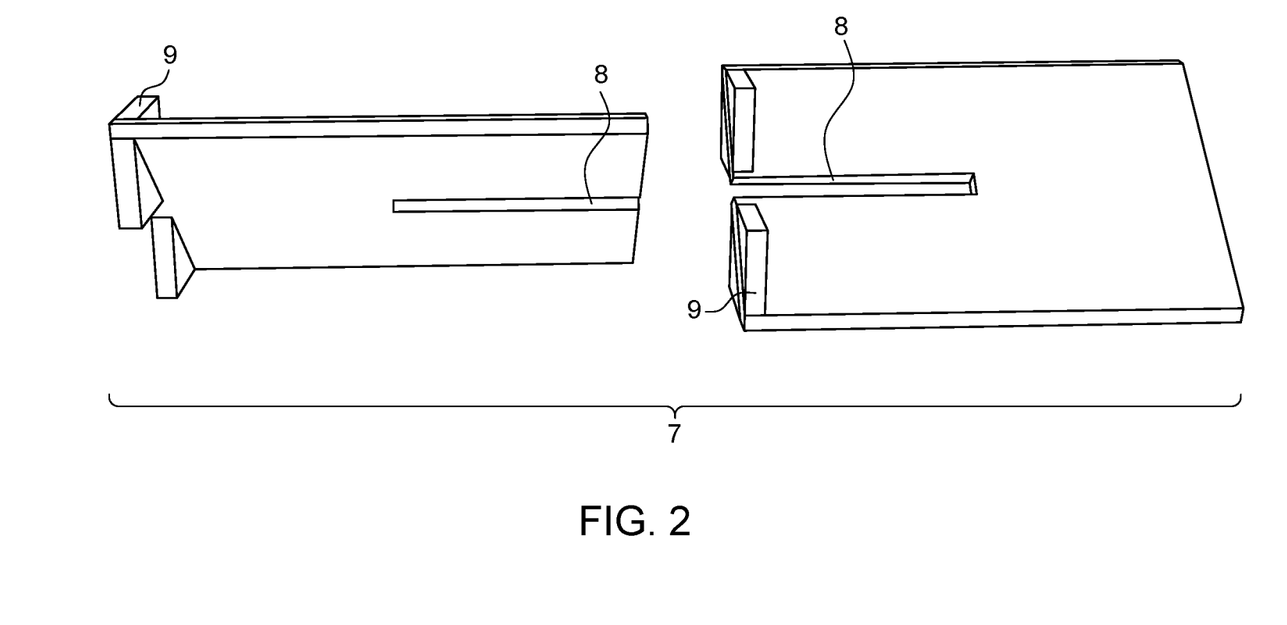
FIG. 2 provides a view of two panels of the embodiment of FIG. 1, shown detached, which combine to form an embodiment of the type of FIG. 1, the construction involving two interlocking boards.
Figure 15:
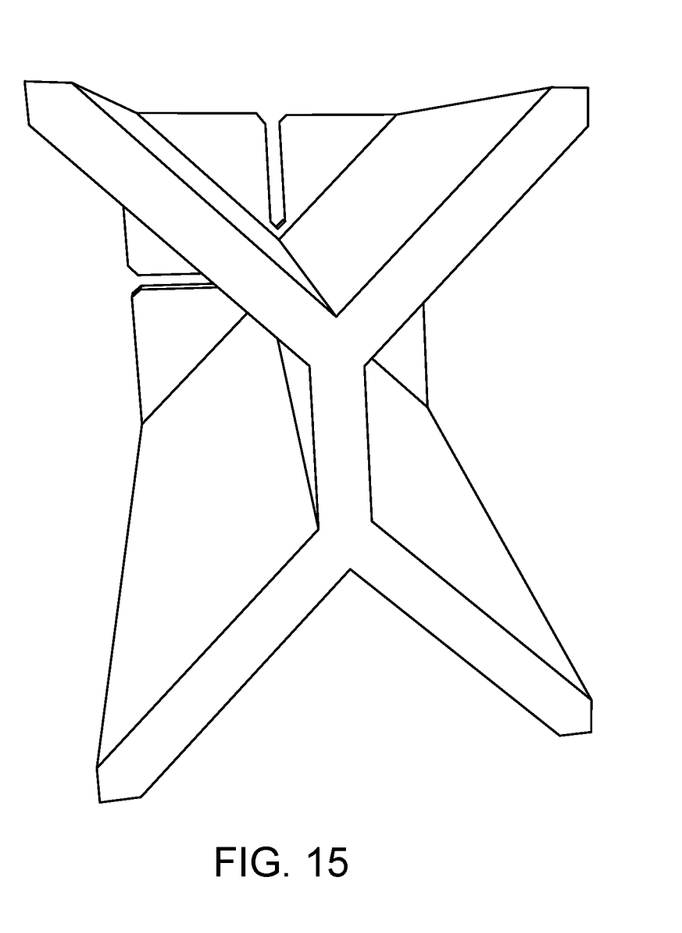
FIG. 15 shows a slightly oblique frontal view of an embodiment of present invention constructed such that the knife slot at the closed end of the trough does not go all the way down to the bottom of the trough creating the potential for a small reservoir at the bottom of the trough.

Third panel 5 serves to block comestibles 15 from exiting trough 1 at one end. Each panel 3 and 4 of a disassembleable embodiment preferably provides grooves 8 that allow panels 3 and 4 to be assembled (and disassembled) in a manner, longitudinally or orthogonally, that creates trough(s) 1 and device 7. Slot 2, as shown in FIG. 15, may be structured to not extend completely to the bottom of a trough, in order to retain juices.

Figure 3:
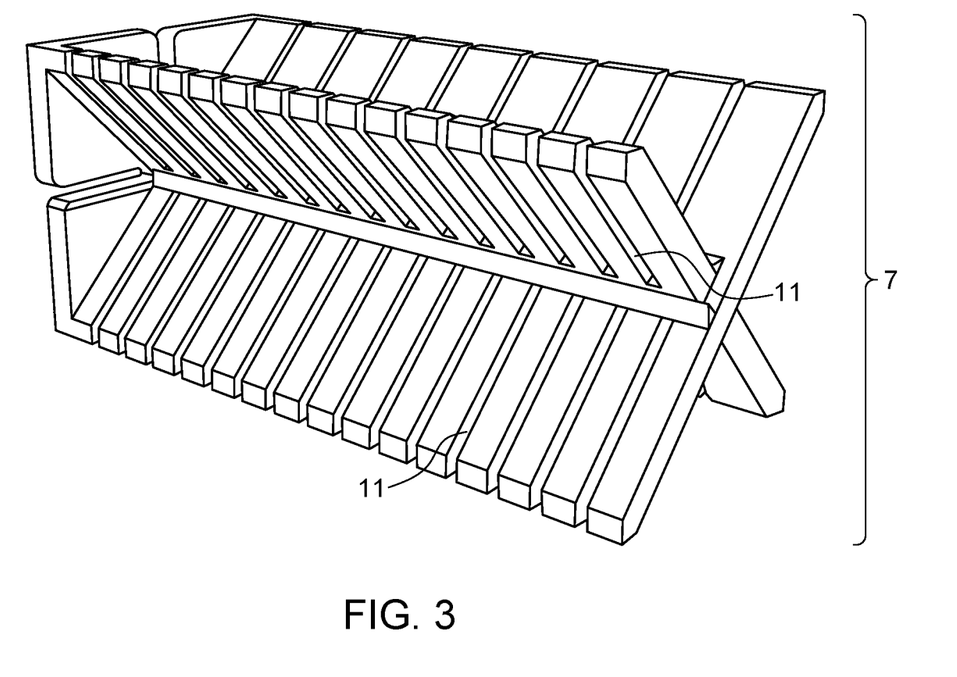
FIG. 3 offers a perspective view of an alternative embodiment of the cutting board of FIG. 1 featuring additional side panel slots to also enable parallel transverse cuts.
Figure 7:
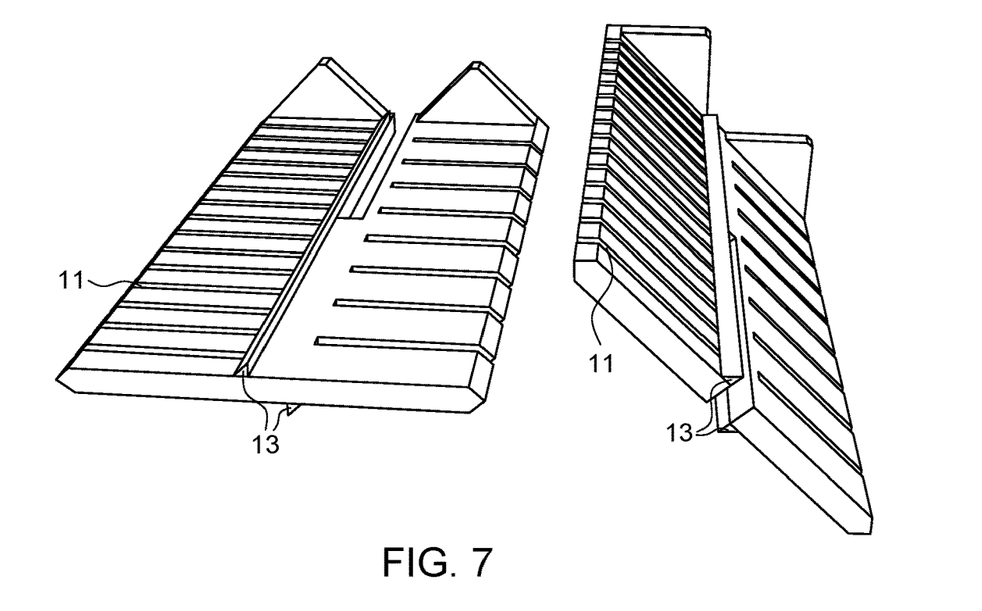
FIG. 7 illustrates an embodiment of the invention similar to FIG. 3 and comprising two interlocking boards with an integral end piece and slot and also with transverse blade guides and including a wedge at the bottom of a trough which gives the trough a flat bottom.
Figure 8:
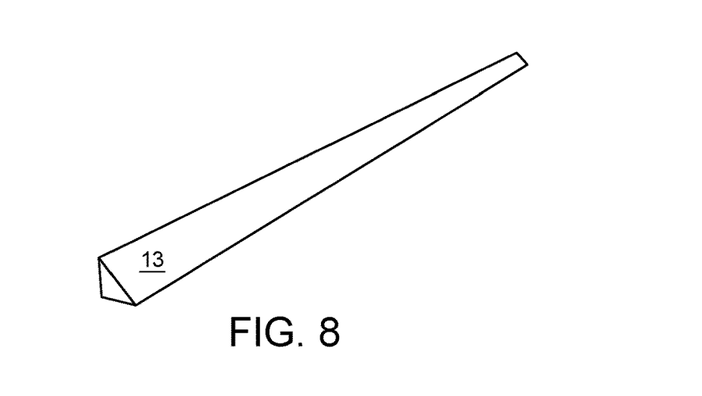
FIG. 8 offers an embodiment of a wedge that may serve as a bottom of a trough of FIG. 7 to give an angular trough a flat bottom.
Figure 9:
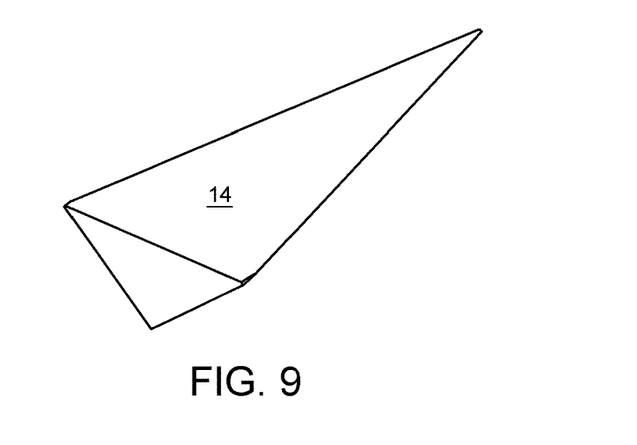
FIG. 9 offers an embodiment of an alternate wedge to that of FIG. 8 that may serve as a bottom of a trough to give the trough a flat and slopping bottom.
Figure 10:
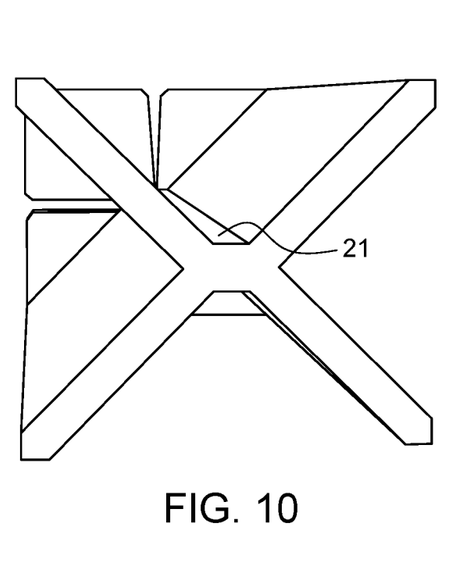
FIG. 10 offers a front perspective view, looking down a trough from an open end to a closed end, of an embodiment of the invention that has multiple troughs and in this embodiment two troughs form a "V" at the bottom and two troughs have flat bottoms.

The bottom of trough 1 formed by panels 3 and 4 may be modified from a V shape (or any other shape) to a flat shape. FIGS. 3 and 7 show a flat bottom created by placing in a wedge 13 or 14 (FIGS. 8, 9) into the bottom of the trough 1. This wedge 13 or 14 could be affixed to either bisecting panel 3 or 4 as per FIG. 7 or could be inserted as a separate piece, as per FIGS. 8 and 9. Wedge 13 or 14 could form a flat or a longitudinally sloped flat bottom cutting surface 21 at the bottom of a trough 1 that is either parallel to or longitudinally sloping with regard to the surface 12 upon which device 7 rests. In particular pointed wedge 14 could be inserted into trough 1 to create a flat bottom 21 that creates a slope from the open end of device 7 down toward the closed end of the device 7 formed by panel 5.

Each side panel 3 and 4 could be cut in such a manner as to produce slots 11, as per FIGS. 3 and 7, that would also enable cuts transversely across trough 1.

It is to be understood that interlocking panels 3 and 4 need not interlock perpendicularly but could be aligned to create troughs 1 of different angles and volumes.

Figure 14:
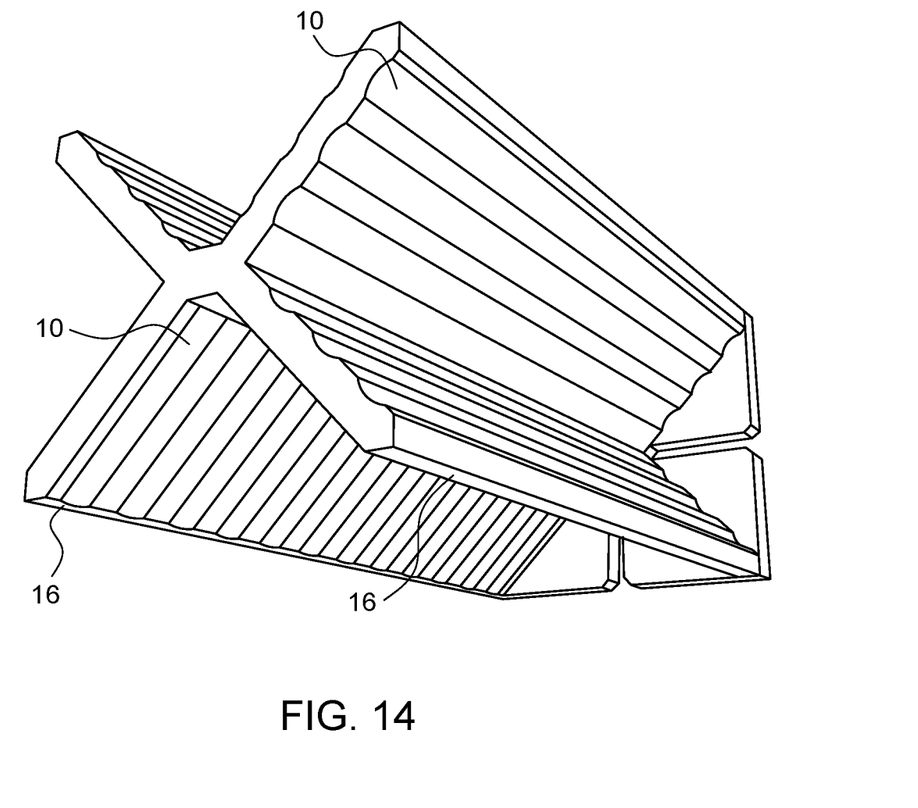
FIG. 14 offers a perspective view of an embodiment of the invention constructed of one piece with side panels that provide uneven surfaces.

The sides of troughs 1 may be flat or they may be ridged, grooved, dimpled, bumpy or otherwise contoured or uneven, as in FIG. 14. The intent is to provide uneven side surfaces to prevent cut comestibles, from tending to stick to a side wall. The ends of side panels 3 and 4 preferably may have a double bevel to assist the side panels to function as bases.

Again panels 3 and 4 or the cutting board base 16, as numbered in FIG. 14, may be structured in such a way as to cause a trough 1 to slope when sitting on a horizontal surface 12.

Figure 11:
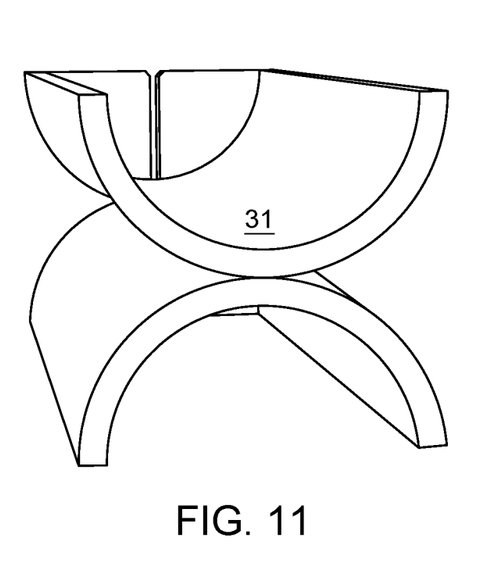
FIG. 11 offers a front perspective view, looking down a trough from an open end to a closed end, of an embodiment of the invention that provides curved troughs, in this case half pipe shaped.
Figure 12:
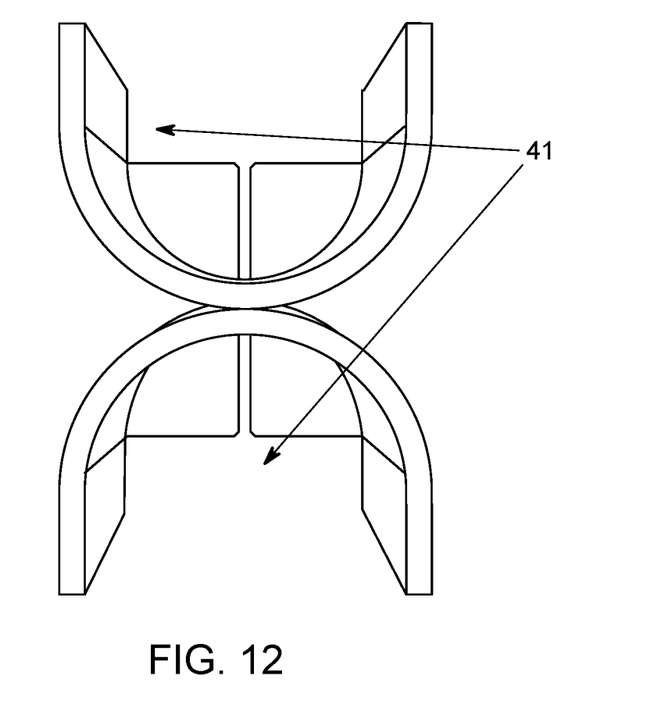
FIG. 12 offers a front perspective view, looking down a trough from an open end to a closed end, of an embodiment of the invention that provides, curved troughs, in this case "U" shaped.
Figure 13A:
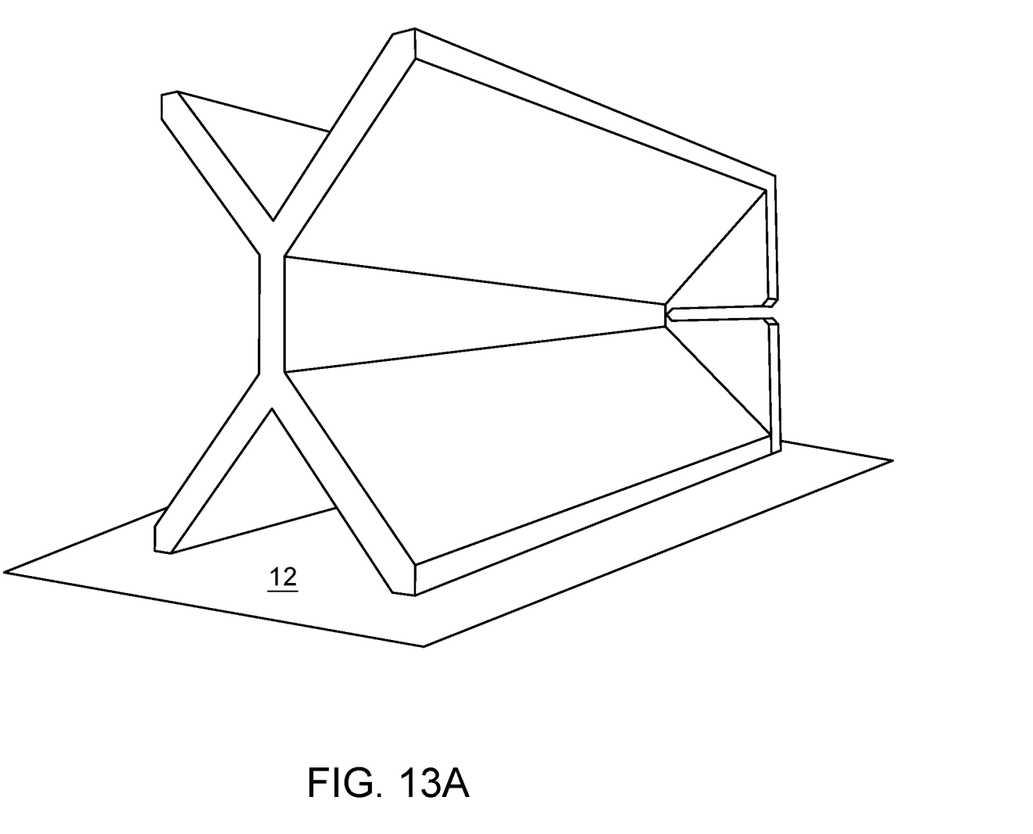
FIG. 13A offers a side view of an embodiment of the invention constructed in one unit and such that two troughs (top and bottom as shown) slope longitudinally downwardly and upwardly, respectively, (as shown) from an open end to a closed end when sitting on a horizontal surface and where two troughs have flat bottoms whose widths diminish from the open end to the closed end.
Figure 13B:
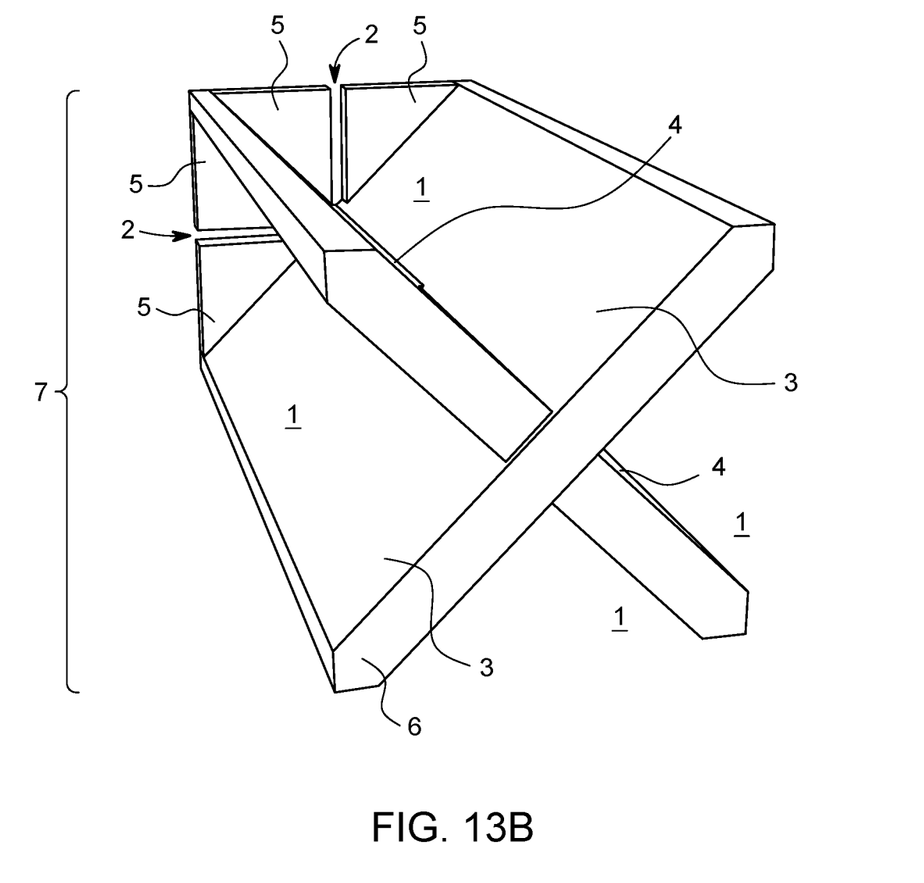
FIG. 13B shows an oblique raised frontal view of an embodiment of present invention constructed such that the panels that form the troughs are thicker at the open end of the device and thinner toward the closed end which has the effect of creating troughs that slope toward the closed end when the device is sitting on a horizontal surface.

And again, troughs 1 may have rounded bottoms, such as formed by a half pipe 31 or "U" shape 41 of FIGS. 11 and 12.

The foregoing is considered as illustrative only of the principles of the invention. Numerous modification and changes may occur to those skilled in the art. All suitable modification and equivalents may be considered as falling within the scope of the invention.

What is claimed is:

1. A comestible cutting/chopping board structured for holding seed-to-egg sized comestibles, comprising:
    side walls defining at least one longitudinal trough, the trough, having a V or U or half-pipe slope with an open top and an angled, curved or flat bottom;
    a base connected to the at least one trough, structured to stabilize the trough upon a horizontal surface;
    a structure traversing the side walls, attached to the side walls or base, providing a slot structured for penetration of a longitudinally oriented knife and providing at least partial retention of comestibles in the trough; and
    board side walls, wherein the base is formed from extension of the board side walls, the extensions themselves forming a cutting/chopping trough upon rotation.

2. The cutting/chopping board of claim 1 including the structure traversing the side walls forming an end piece of the trough.

3. The cutting/chopping board of claim 2 including the trough being open at an end opposite the end piece.

4. The cutting/chopping board of claim 1 including side walls structured in combination to form a plurality of troughs.

5. The cutting/chopping board of claim 1 including a plurality of U-shaped or V-shaped or half-pipe shaped troughs.

6. The cutting/chopping board of claim 1 wherein the trough is configured to incline longitudinally downwardly, toward the traversing structure, upon the trough being stabilized upon a horizontal surface by the base.

7. The cutting/chopping board of claim 1 wherein the at least one trough has a flat bottom.

8. The cutting/chopping board of claim 1 including side walls structured of two pieces that interlock.

9. The cutting/chopping board of claim 8 wherein the trough is formed of removably interlocking side walls.

10. The cutting/chopping board of claim 9 wherein the direction of interlocking is orthogonal to the trough longitudinal direction.

11. The cutting/chopping board of claim 9 wherein the direction of interlocking is in the trough longitudinal direction.

12. The cutting/chopping board of claim 1 integrally formed of one piece.

13. The cutting/chopping board of claim 1 wherein the side walls of the at least one trough present uneven inner surfaces.

14. The cutting/chopping board of claim 1 wherein the side walls terminate in a double beveled end surface.

15. The cutting/chopping board of claim 1 wherein the traversing side wall end piece is structured in four sections, each section attached to a side wall at a side wall end location.

16. The cutting/chopping board of claim 1 wherein the side walls provide slots for slicing orthogonally to the trough longitudinal direction.

17. The cutting/chopping board of claim 1 comprising multiple troughs of different sizes.

18. A comestible cutting/chopping board structured for holding seed-to-egg sized comestibles, comprising:
   side walls defining at least one longitudinal trough, the trough, having a V or U or half-pipe slope with an open top and an angled, curved or flat bottom;
   a base connected to the at least one trough, structured to stabilize the trough upon a horizontal surface;
   a structure traversing the side walls, attached to the side walls or base, providing a slot structured for penetration of a longitudinally oriented knife and providing at least partial retention of comestibles in the trough; and
   wherein the side walls are structured in combination to form a plurality of troughs.

19. A comestible cutting/chopping board structured for holding seed-to-egg sized comestibles, comprising:
   side walls defining at least one longitudinal trough, the trough, having a V or U or half-pipe slope with an open top and an angled, curved or flat bottom;
   a base connected to the at least one trough, structured to stabilize the trough upon a horizontal surface;
   a structure traversing the side walls, attached to the side walls or base, providing a slot structured for penetration of a longitudinally oriented knife and providing at least partial retention of comestibles in the trough; and
   including a plurality of U-shaped or V-shaped or half-pipe shaped troughs.

* * * * *